United States Patent
Heirtzler et al.

(10) Patent No.: US 9,556,662 B2
(45) Date of Patent: Jan. 31, 2017

(54) WINDOW REGULATOR AND METHOD OF PROVIDING ARTICULATING MOTION TO A WINDOW IN A VEHICLE DOOR

(71) Applicant: FORD GLOBAL TECHNOLOGIES, LLC, Dearborn, MI (US)

(72) Inventors: Paul L. Heirtzler, Northville, MI (US); Donald P. Iacovoni, Plymouth, MI (US); Scott George Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/686,814

(22) Filed: Apr. 15, 2015

(65) Prior Publication Data

US 2016/0305179 A1    Oct. 20, 2016

(51) Int. Cl.
*E05F 15/603* (2015.01)
*B60J 1/14* (2006.01)

(52) U.S. Cl.
CPC .......... *E05F 15/603* (2015.01); *B60J 1/14* (2013.01); *E05Y 2900/55* (2013.01)

(58) Field of Classification Search
CPC .................................. E05F 15/603; B60J 1/14
USPC .................. 49/138, 226, 227, 348, 349, 352
See application file for complete search history.

(56) References Cited

U.S. PATENT DOCUMENTS

| | | | |
|---|---|---|---|
| 2,298,515 A | 10/1942 | Sullivan | |
| 2,745,662 A | 5/1956 | Mcdougall | |
| 2,957,725 A | 10/1960 | Ford, II et al. | |
| 3,078,120 A * | 2/1963 | Faber | B60J 1/17 16/91 |
| 3,299,571 A * | 1/1967 | Carpenter | E05F 15/689 49/145 |
| 3,415,016 A * | 12/1968 | Lystad | E05F 11/423 49/227 |
| 3,541,732 A * | 11/1970 | Hanson | E05F 11/385 49/227 |
| 3,591,983 A * | 7/1971 | Hanson | E05F 11/382 49/227 |
| 3,604,151 A * | 9/1971 | Ventre | E05F 11/465 49/227 |
| 3,646,707 A * | 3/1972 | Lystad | E05F 11/382 49/227 |
| 4,615,143 A * | 10/1986 | Isetani | E05F 11/525 49/226 |
| 4,633,613 A * | 1/1987 | Kobayashi | E05F 11/382 49/227 |
| 4,796,943 A | 1/1989 | Fukutomi et al. | |

(Continued)

FOREIGN PATENT DOCUMENTS

FR    1577178 A  *  8/1969  ............ B60J 7/0573

*Primary Examiner* — Jerry Redman
(74) *Attorney, Agent, or Firm* — Jason Rogers; King & Schickli, PLLC

(57) ABSTRACT

A window regulator is provided for a window in a vehicle door. The window regulator includes a drive mechanism having a first cable and a second cable. The first cable is connected to the window at a first connection point and the second cable is connected to the window at a second connection point. The two cables are driven at different speeds so that the window is rotated with respect to the vehicle door panel as the window is displaced between a fully closed position and a fully opened position.

9 Claims, 5 Drawing Sheets

(56) References Cited

U.S. PATENT DOCUMENTS

| | | | |
|---|---|---|---|
| 4,877,287 A * | 10/1989 | Escaravage | B60N 2/464 |
| | | | 297/115 |
| 4,970,827 A | 11/1990 | Djordjevic | |
| 5,685,596 A | 11/1997 | Tokarz et al. | |
| 6,526,696 B2 * | 3/2003 | Cardine | E05F 11/488 |
| | | | 49/227 |
| 8,037,640 B2 | 10/2011 | Boddy et al. | |
| 8,225,551 B2 * | 7/2012 | Castellon | B60J 1/17 |
| | | | 49/226 |
| 8,727,419 B2 | 5/2014 | Syvret et al. | |
| 8,793,938 B2 | 8/2014 | Grudzinski et al. | |
| 2008/0271379 A1 * | 11/2008 | Rietdijk | B60J 1/14 |
| | | | 49/142 |
| 2014/0252795 A1 | 9/2014 | Willard et al. | |

\* cited by examiner

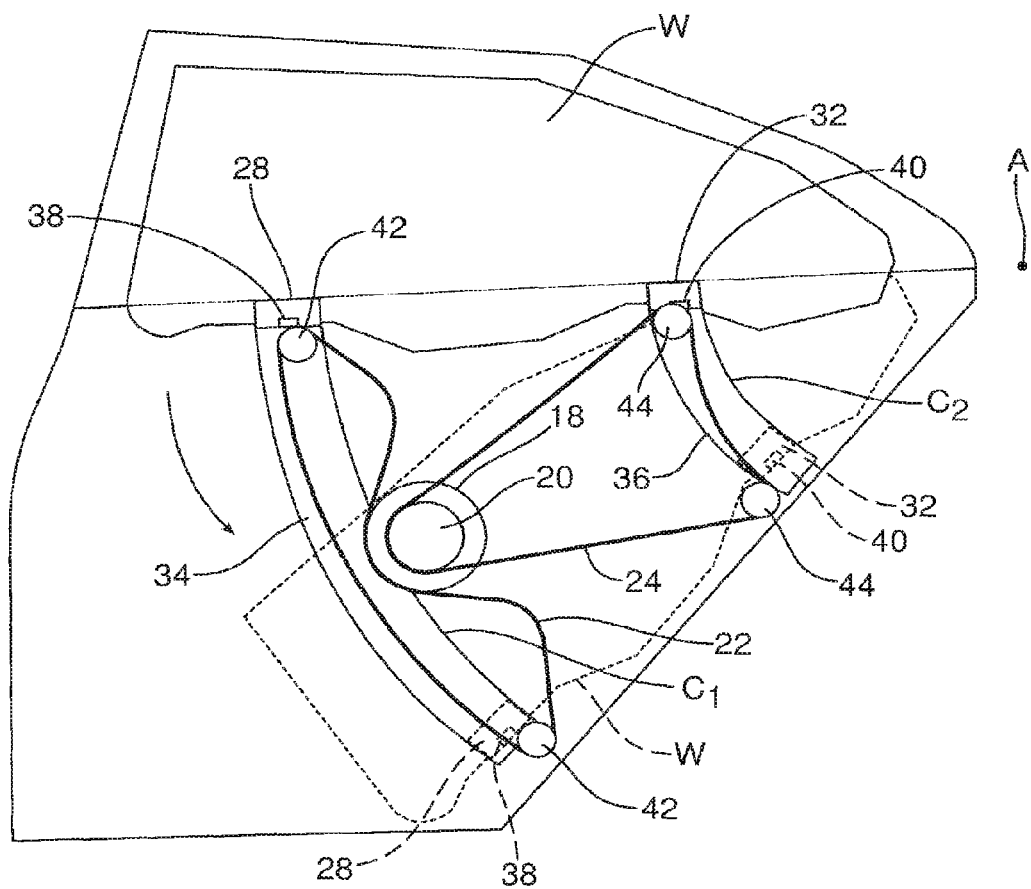

WINDOW REGULATOR AND METHOD OF PROVIDING ARTICULATING MOTION TO A WINDOW IN A VEHICLE DOOR

TECHNICAL FIELD

This document relates generally to the motor vehicle field and, more particularly, to a window regulator and a related method of providing articulating motion to a window in a vehicle door.

BACKGROUND

In motor vehicle applications, there are challenges with designing movable windows or door glass to drop inside of the door structure. Often the shape of the lower door structure does not accommodate the complete lowering of a full door glass window using traditional automotive hardware systems. This is typically an issue on rear side doors, where the location of the rear wheel well might necessitate a certain shape and size of the lower door structure that is smaller than desired, or on a front door with an outside rearview mirror that is not mounted above the beltline.

In the past, this problem has generally been resolved by one of two compromises. In the first of these compromises, illustrated in FIG. 1a, the window or door glass W does not drop completely below the beltline B found on the door at the lower side of the window frame. In this situation, the vehicle occupant does not have a comfortable place to rest his arm when the window is down. Further, there is only limited room to pass items through the opening O above the window and the portion of the opening remaining covered by the window significantly limits available ventilation.

In option number two, illustrated in FIG. 1b, the size of the movable portion of the window or door glass W is reduced so that portion may be fully opened and dropped into the door panel P. Unfortunately, this compromise increases the cost and complexity of the window system due to, for example, the addition of a fixed piece of glass G and the division bar seal S or an applique that blocks a portion of the daylight opening.

This document relates to a new and improved window regulator and method of providing articulating motion to a window in a vehicle door that allows the full lowering of a full-sized window into the door panel, while avoiding the compromises previously set forth in this document.

SUMMARY

In accordance with the purposes and benefits described herein, a window regulator is provided for a window in a vehicle door. That window regulator comprises a drive mechanism including a first cable and a second cable. The first cable is connected to the window at a first connection point. The second cable is connected to the window at a second connection point. The first cable is driven at a first speed $S_1$ and the second cable is driven at a second speed $S_2$ where $S_1 \neq S_2$ so that the window is rotated with respect to the vehicle door as the window is displaced between a fully closed position and a fully opened position.

In one possible embodiment, the drive mechanism includes a first drum about which the first cable is wound and a second drum about which the second cable is wound. That first drum may have a first radius $R_1$ and the second drum may have a second radius $R_2$ where $R_1 \neq R_2$. Further, the drive mechanism includes a single motor that drives the first drum and the second drum.

In an alternative embodiment, the drive mechanism includes a first motor that drives the first drum and a second motor that drives the second drum. The drive mechanism of any such embodiments may further include a controller configured to control the driving of the first cable at the first speed $S_1$ and the second cable at the second speed $S_2$.

In one possible embodiment, the window regulator further includes a first window connector that connects the first cable to the window at the first connection point and a second window connector that connects the second cable to the window at the second connection point. Further, the window regulator includes a first guide channel and a second guide channel. In addition, the first connector includes a first follower so that the first connector slides along the first guide channel and the second connector includes a second follower so that the second connector slides along the second guide channel. Further, the first channel has a first radius of curvature $C_1$ and the second channel has a second radius of curvature $C_2$ where $C_1 > C_2$. In addition, the first radius of curvature $C_1$ and the second radius of curvature $C_2$ are about a common axis located vehicle rearward of the window.

In accordance with an additional aspect, a method is provided for moving a window in a vehicle door with articulating motion. That method may be broadly described as comprising the steps of: (a) moving the window at a first point at a first speed $S_1$ and (b) moving the window at a second point at a second speed $S_2$ where $S_1 \neq S_2$ whereby the window is rotated with respect to the vehicle door as the window is displaced between a fully closed position and a fully opened position.

Still further, the method may include the step of connecting a first cable on a first drum to the first point and connecting a second cable on a second drum to the second point. In addition, the method may include using the first drum with a first radius $R_1$ and the second drum with a second radius $R_2$ where $R_1 \neq R_2$. The different drum radii $R_1$, $R_2$ allow a single motor to drive the two cables at different speeds.

Alternatively, the method may include driving the first drum with a first drive motor and driving the second drum with a second drive motor. Still further, the method may include moving the first point along a first radius of curvature $C_1$ and the second point along the second radius of curvature $C_2$ where $C_1 > C_2$ and the first radius of curvature $C_1$ and the second radius of curvature $C_2$ are about a common axis located vehicle rearward of the window.

In the following description, there are shown and described several preferred embodiments of the window regulator and related method. As it should be realized, the window regulator and method are capable of other, different embodiments and their several details are capable of modification in various, obvious aspects all without departing from the window regulator and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the window regulator and together with the description serve to explain certain principles thereof. In the drawing figures:

FIG. 3 is a schematic illustration of the window regulator illustrated in FIG. 2 and showing the window in full-line in a fully closed position and in phantom line in a fully open position wherein the entire window is below the belt of the vehicle inside the door panel and the window opening is fully opened.

Reference will now be made in detail to the present preferred embodiments of the window regulator, examples of which are illustrated in the accompanying drawing figures.

DETAILED DESCRIPTION

Figure 1A:
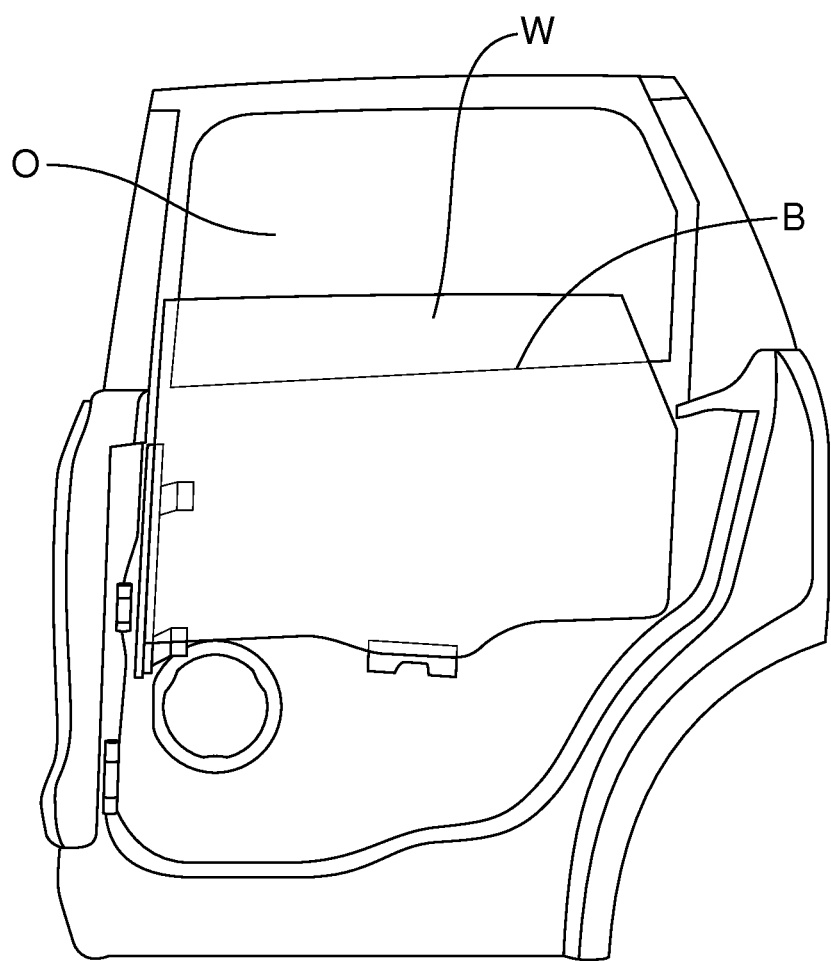
FIG. 1a illustrates one type of prior art compromise made when a door panel will not accommodate fully opening a full-size window or door glass.
Figure 1B:
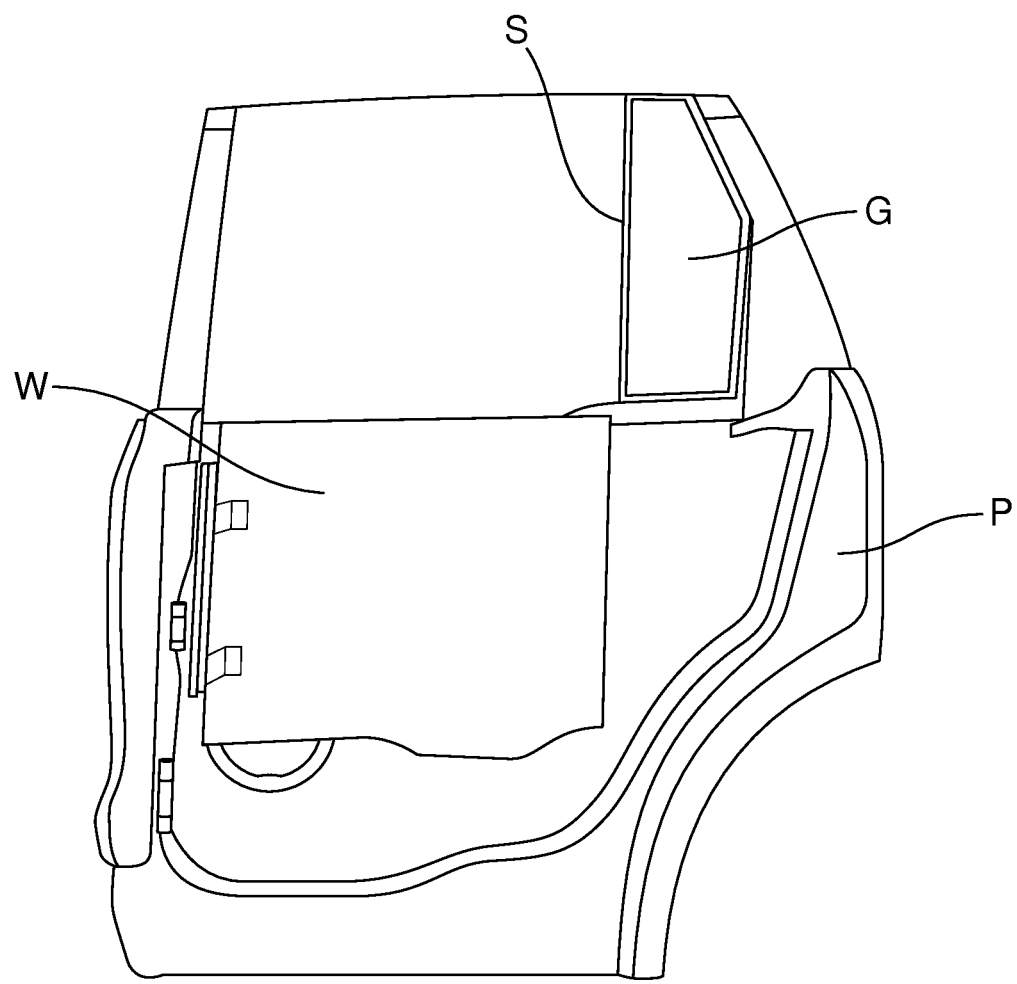
FIG. 1b illustrates a second type of prior art compromise when a door panel will not accommodate fully opening a full-size window or door glass.
Figure 2:
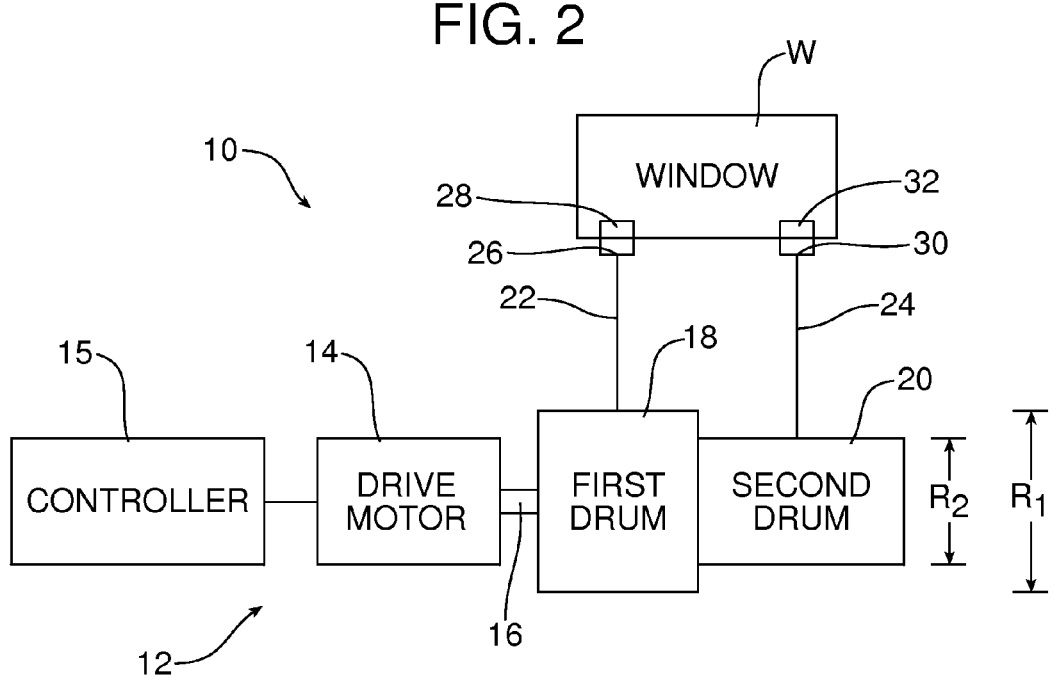
FIG. 2 is a schematic block diagram of a first embodiment of window regulator that provides for articulating motion of a window within a vehicle door.
Figure 4:
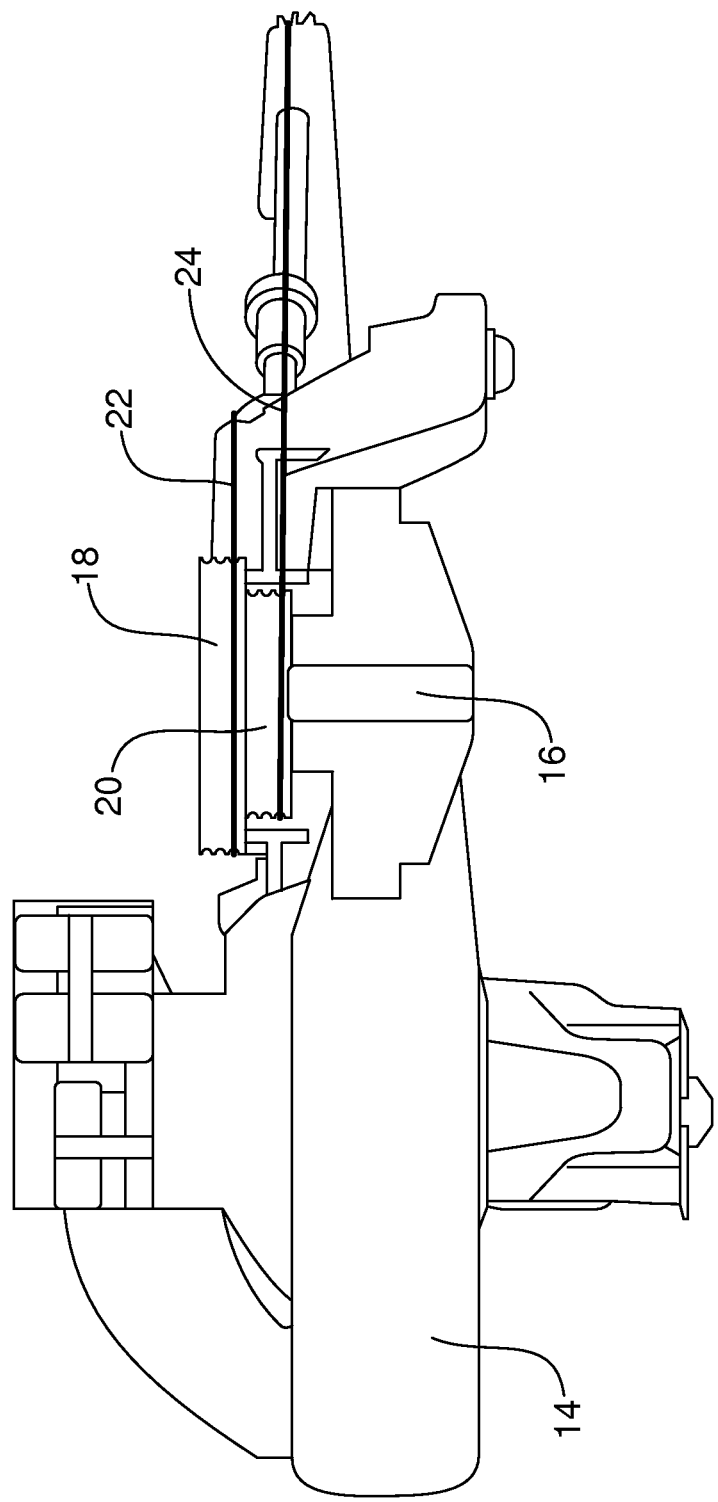
FIG. 4 is a cross-sectional view through line 4-4 of FIG. 3.

Reference is now made to FIGS. 2-4 illustrating a window regulator 10 for a vehicle door window W. As illustrated schematically in FIG. 2, the window regulator 10 includes a drive mechanism 12 including a drive motor 14 having a drive shaft 16 that simultaneously drives a first drum 18 and a second drum 20. A first cable 22 is wound on the first drum 18 while a second cable 24 is wound on the second drum 20. As further illustrated, the first cable 22 is connected to the window W at a first connection point 26 on a first window connector 28. In contrast, the second cable 24 is connected to the window W at a second connection point 30 by means of the second connector 32.

As illustrated in FIG. 2, the first drum 18 has a first radius $R_1$ while the second drum 20 as a second radius $R_2$ where $R_1 \neq R_2$. More specifically, in the illustrated embodiment, the first radius $R_1$ is greater than the second radius $R_2$. Further, the drive motor 14, under control of the controller 15, drives the first drum 18 and second drum 20 through the drive shaft 16 so that each drum rotates 360° simultaneously. Since the first drum 18 has the larger radius $R_1$ the first cable 22 wound on the first drum moves at a first speed $S_1$ that is not equal to, and in the illustrated embodiment is greater than, the speed $S_2$ of the second cable 24 wound on the second drum 20. As a result, the window W at the first connection point 26 moves at a first speed $S_3$ greater than the window at the second connection point 30 which moves at a second speed $S_4$. As a consequence, the window W is rotated with respect to the vehicle door D as the window is displaced between a fully closed position illustrated in full-line in FIG. 3 and a fully opened position illustrated in the phantom line in FIG. 3.

Reference is now made to FIGS. 3 and 4 which show additional structural details of the window regulator 10. As illustrated, the window regulator 10 further includes a first guide channel 34 and a second guide channel 36. The first connector 28 includes a first follower 38 that engages and slides along the first guide channel 34. Similarly, the second connector 32 includes a second follower 40 that engages and slides along the second guide channel 36.

As should be noted, the first guide channel 34 has a first radius of curvature $C_1$ while the second guide channel 36 has a second radius of curvature $C_2$ where $C_1 > C_2$ and the first radius of curvature $C_1$ and the second radius of curvature $C_2$ are about a common axis A located vehicle rearward of the window W.

As further illustrated in FIG. 3, the first cable 22, wound around the first drum 18, is connected to the first drum at both ends, connected to the first connector 28 at an intermediate point and further guided by pulleys 42 at opposite ends of the first guide channel 34. Similarly, the second cable 24 is connected at both ends to the second drum 20, connected to the second connector 32 at an intermediate point and further guided by two pulleys 44 at opposite ends of the second guide channel 36.

When one wishes to open or close the window W, the drive motor 14 is activated to drive the first drum 18 and second drum 20 by means of the drive shaft 16. Since the radius $R_1$ of the first drum 18 is greater than the radius $R_2$ of the second drum 20, the first cable 22 is driven at a first speed $S_1$ that is greater than the speed $S_2$ of the second cable 24 thereby moving the window W at the first connection point 26 at a rate of speed $S_3$ along the first guide channel 34 that is greater than the rate of speed $S_4$ of the second connection point 30 along the second guide channel 36. As a result, the window W is able to traverse the longer first guide channel 34 in the same amount of time the window takes to traverse the shorter second guide channel 36. Accordingly, as the window W is moved from the fully closed position to the fully opened position or vice versa, the window rotates within the door panel D. Advantageously, this allows a full-width window W to be opened so as to be completely below the belt line B and contained within the door panel D when fully opened (note phantom line position of window W in FIG. 3).

Figure 5:
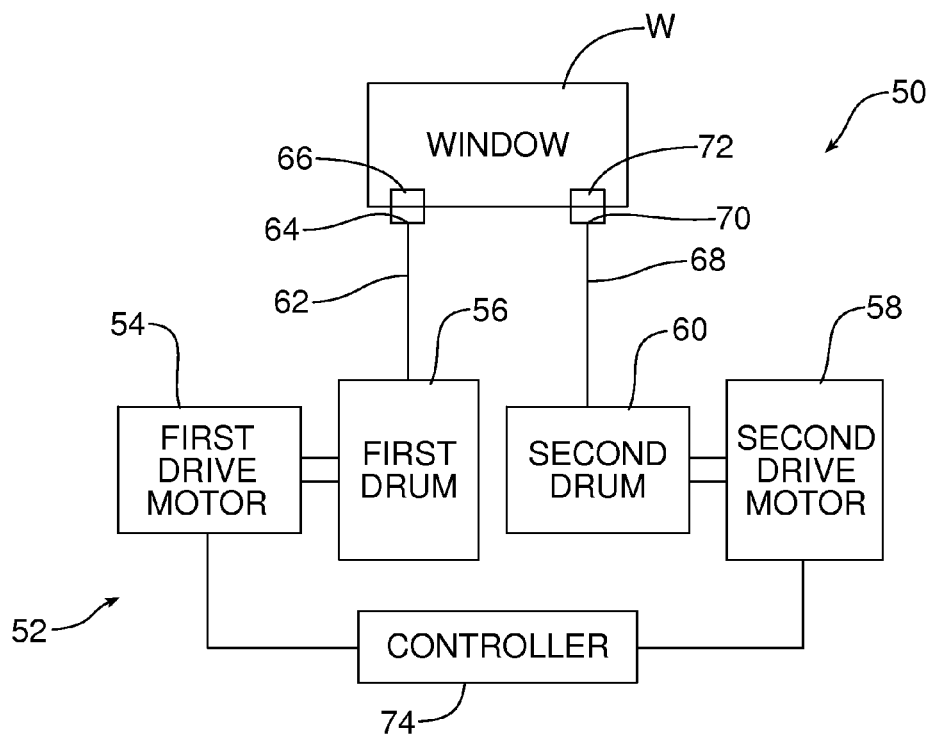
FIG. 5 is a schematic block diagram of yet another embodiment of the window regulator.

Reference is now made to FIG. 5 which schematically illustrates an alternative embodiment of window regulator 50. The window regulator 50 includes a drive mechanism 52 including a first drive motor 54 for driving a first drum 56 and a second drive motor 58 for driving a second drum 60. A first cable 62 wound on the first drum 56 is connected to the window W at a first connection point 64 by means of a first connector 66. A second cable 68 wound on the second drum 60 is connected to the window W at a second connection point 70 by the second connector 72.

In this embodiment, the first and second drums 56, 60 may or may not have different radii Instead, the speed of the cables 62, 68 and the speed of movement of the window connection points 64, 70 is determined by the drive speed of the first and second drive motors 54, 58 under the control of the controller 74. As should be appreciated, the controller 15 of the first embodiment and the controller 74 of this embodiment may comprise a dedicated microprocessor or electronic control unit operating appropriate software for controlling the articulating motion of the window W. Such a controller 15, 74 may include one or more processors, one or more memories and one or more network interfaces that all communicate with each other over a communication bus in a manner known in the art.

As with the form of window regulator 10 illustrated in FIGS. 2 and 3, the second embodiment of window regular 50 moves the window W at a first connection point 64 at a first speed $S_3$ and at a second connection point 70 at a second speed $S_4$ where $S_3 \neq S_4$. As a result, the window W is rotated with respect to the vehicle door panel D as the window is displaced between a fully closed position and a fully open position in a manner similar to that illustrated in FIG. 3. Since the second embodiment of window regulator 50 utilizes two drive motors 54, 58 instead of a single drive motor 14 as in the first embodiment of window regulator 10, the second window regulator 50 has greater flexibility. This is because the two drive motors 54, 58 allow the cables 62, 68 connected to the window W to be operated at different and/or varying speeds and even with different start or stop times as may be necessary to achieve a more complex motion of the window as it is turned or rotated during displacement from the fully closed position to the fully opened position and back again. Such complex motion may be necessary depending upon the size and shape of the window W and the available space within the door panel D to accommodate that window when it is in the fully opened position.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A window regulator for a window in a vehicle door, comprising:
   a drive mechanism including a first cable and a second cable, said first cable being connected to the window at a first connection point and said second cable being connected to the window at a second connection point whereby said first cable is driven at a first speed $S_1$, and said second cable is driven at a second speed $S_2$ where $S_1 \neq S_2$ so that the window is rotated with respect to the vehicle door as the window is displaced between a fully closed position and a fully opened position.

2. The window regulator of claim 1, wherein said drive mechanism includes a first drum about which said first cable is wound and a second drum about which said second cable is wound.

3. The window regulator of claim 2, wherein said first drum has a first radius $R_1$ and said second drum has a second radius $R_2$ where $R_1 \neq R_2$.

4. The window regulator of claim 2, wherein said drive mechanism includes a controller configured to control driving of said first cable at said first speed $S_1$ and said second cable at said second speed $S_2$.

5. The window regulator of claim 2, further including a first window connector connecting said first cable to the window at said first connection point and a second window connector connecting said second cable to the window at said second connector point.

6. The window regulator of claim 5, further including a first guide channel and a second guide channel.

7. The window regulator of claim 6, wherein said first connector includes a first follower so that said first connector slides along said first guide channel and said second connector includes a second follower so that said second connector slides along said second guide channel.

8. The window regulator of claim 6, wherein said first guide channel has a first radius of curvature $C_1$ and said second guide channel has a second radius of curvature $C_2$ where $C_1 > C_2$ and said first radius of curvature $C_1$ and said second radius of curvature $C_2$ are about a common axis located rearward of the window.

9. A window regulator for a window in a vehicle door, comprising:
   a drive mechanism including a first cable and a second cable, a first drum about which said first cable is wound and a second drum about which said second cable is wound, and a first motor that drives said first drum and a second motor that drives said second drum, said first cable being connected to the window at a first connection point and said second cable being connected to the window at a second connection point whereby said first cable is driven at a first speed $S_1$, and said second cable is driven at a second speed $S_2$ where $S_1 \neq S_2$ so that the window is rotated with respect to the vehicle door as the window is displaced between a fully closed position and a fully opened position.

* * * * *